US010586028B2

(12) United States Patent
Elliott et al.

(10) Patent No.: US 10,586,028 B2
(45) Date of Patent: Mar. 10, 2020

(54) CUSTOMIZED BIOMETRIC DATA CAPTURE FOR IMPROVED SECURITY

(71) Applicant: Purdue Research Foundation, West Lafayette, IN (US)

(72) Inventors: Stephen John Elliott, West Lafayette, IN (US); Kevin James O'Connor, West Lafayette, IN (US); Colin Robert Patterson, West Lafayette, IN (US); Andrew Douglas Marshall, West Lafayette, IN (US); Matthew Wayne Sprau, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/031,003

(22) PCT Filed: Oct. 21, 2014

(86) PCT No.: PCT/US2014/061553
§ 371 (c)(1),
(2) Date: Apr. 21, 2016

(87) PCT Pub. No.: WO2015/061304
PCT Pub. Date: Apr. 30, 2015

(65) Prior Publication Data
US 2016/0267263 A1    Sep. 15, 2016

Related U.S. Application Data

(60) Provisional application No. 61/893,712, filed on Oct. 21, 2013.

(51) Int. Cl.
*G06F 21/00* (2013.01)
*G06F 21/32* (2013.01)
(Continued)

(52) U.S. Cl.
CPC ............. *G06F 21/32* (2013.01); *G06F 3/016* (2013.01); *G06K 9/00013* (2013.01)

(58) Field of Classification Search
CPC ....................................................... G06F 21/32
See application file for complete search history.

(56) References Cited

U.S. PATENT DOCUMENTS 6,064,753 A * 5/2000 Bolle ................. G06K 9/00013
340/5.53
7,689,013 B2 * 3/2010 Shinzaki ............. G06K 9/0012
340/5.52

(Continued)

FOREIGN PATENT DOCUMENTS

EP           1975852 A1 * 10/2008  ............. G06K 9/628

OTHER PUBLICATIONS

Beveridgel, J. R., et al., Biometric zoos: theory and experimental evidence, The International Joint Conference on Biometrics (IJCB), (2011).

(Continued)

*Primary Examiner* — Ali Shayanfar
(74) *Attorney, Agent, or Firm* — Purdue Research Foundation

(57) ABSTRACT

An apparatus, comprising a biometric fingerprint identification sensor, the biometric fingerprint identification sensor configured to receive an input from a user, the input corresponding to a-predetermined factor, the predetermined factor comprising a force applied by a finger of the user to the biometric fingerprint identification sensor. A connected computer processor determines a qualitative or quantitative threshold based on the predetermined factor, receive the input from the fingerprint identification sensor, calculate a value of a variable associated with the predetermined factor and the input, and trigger a feedback output when the value approaches the threshold within a margin. A connected (Continued)

US 10,586,028 B2

Page 2 haptic feedback is device configured to provide haptic feedback to the body of the user when the haptic feedback device receives the triggered feedback output from the computer processor indicating the value is within the margin of the predetermined threshold.

4 Claims, 6 Drawing Sheets

(51) Int. Cl.
G06F 3/01 (2006.01)
G06K 9/00 (2006.01)

(56) References Cited

U.S. PATENT DOCUMENTS

| | | | | | |
|---|---|---|---|---|---|
| 8,482,381 | B2* | 7/2013 | Chatterjee | | G06F 3/016 340/5.52 |
| 2006/0101281 | A1* | 5/2006 | Zhang | | H01P 5/107 713/186 |
| 2007/0050303 | A1* | 3/2007 | Schroeder | | G06F 21/32 705/67 |
| 2008/0091425 | A1* | 4/2008 | Kane | | G10L 17/04 704/246 |
| 2009/0027351 | A1* | 1/2009 | Zhang | | H01P 5/107 345/173 |
| 2009/0102296 | A1* | 4/2009 | Greene | | H01Q 1/243 307/149 |
| 2009/0219154 | A1* | 9/2009 | Kukula | | G06K 9/00006 340/540 |
| 2012/0281890 | A1* | 11/2012 | Kamakura | | G06K 9/00067 382/126 |
| 2013/0303048 | A1* | 11/2013 | Grossman | | A63H 33/00 446/486 |
| 2014/0176332 | A1* | 6/2014 | Alameh | | G06F 21/32 340/665 |
| 2015/0135108 | A1* | 5/2015 | Pope | | G06K 9/00006 715/767 |

OTHER PUBLICATIONS

Doddington, G., et al., Sheep, goats, lambs and wolves: A statistical analysis of speaker performance in the NIST 1998 speaker recognition evaluation, The 5th International Conference on Spoken Language Processing, 13, 1-5 (1998).

Kukula, E. P., et al., (2010). The human-biometric-sensor interaction evaluation method: Biometric performance and usability measurements. IEEE Transactions on Instrumentation and Measurement, 59(4), 784-791 (2010).

Mansfield, T., et al., Biometric Product Testing Final Report, (1), 1-22. Teddington, UK (2001).

Paone, J., et al, Difficult imaging covariates or difficult subjects?—An empirical investigation, 2011 International Joint Conference on Biometrics (IJCB), (2011).

Park, S., et al., Receiver operating characteristic (ROC) curve: Practical review for radiologists, Korean Journal Radiology, 5(1), 11-18 (2004).

Rodenberg, C., et al., ROC curve estimation when covariates affect the verification process, Biometrics, 56(4), 1256-62 (2000).

Tabassi, E., Image specific error rate: A biometric performance metric. 2010 20th International Conference on Pattern Recognition, 1124-1127 (2010).

Wittman, M., et al., Empirical studies of the existence of the biometric menagerie in the FRGC 2.0 color image corpus, 2006 Conference on Computer Vision and Pattern Recognition Workshop (CVPRW), (2006) 33-33.

Yager, N., et al., The biometric menagerie, IEEE Transactions on Pattern Analysis and Machine Intelligence, 32(2), 220-30 (2010).

* cited by examiner

CUSTOMIZED BIOMETRIC DATA CAPTURE FOR IMPROVED SECURITY

CROSS-REFERENCE TO RELATED APPLICATIONS

The present U.S. patent application is a 35 U.S.C. §371 national phase application of PCT/US2014/061553, filed Oct. 21, 2014, which is related to and claims the priority benefit of U.S. Provisional Patent Application Ser. No. 61/893,712, filed Oct. 21, 2013, the contents of which is hereby incorporated by reference in its entirety into the present disclosure.

TECHNICAL FIELD

The present disclosure relates generally to improvements in the data acquisition process for biometric sensors, and in particular to data acquisition and feedback methods that are modality neutral.

BACKGROUND

Automated biometric sensors are used to establish or authenticate the identity of a person based on biological characteristics that are in possession of the person. One example of such biometric modality is fingerprint recognition. Various types of fingerprint recognition sensors are known, including optical sensors, capacitance sensors, thermal sensors, and ultrasonic sensors.

Current methods of data acquisition use quantitative measurements of forces that an individual applies to a fingerprint sensor to improve the acquisition process. A lookup table of force measurements is created for multiple fingerprint sensing technologies in order to acquire the highest quality fingerprint images. The optimal finger force to produce the best results varies by fingerprint sensing technology.

A fingerprint acquisition algorithm relies on a constant monitoring of forces applied to a fingerprint sensor by the user's finger. This monitoring allows for acquisition of the fingerprint image to occur when the force level is in an optimal range. The optimal range is illustratively listed in a lookup table accessible by the device. The acquisition algorithm also provides feedback/guidance to the user on how much pressure to apply on the device by comparing the actual force applied to the optimal pressure value for the particular device retrieved from the lookup table. Primary applications of such systems include, but are not limited to: law enforcement, registered traveler programs, financial services, healthcare, telecommunications, social services, electronic commerce, and access control.

Providing a lookup table of force measurements for different fingerprint sensor technologies, and providing constructive feedback to the user resulted in improved quality of the fingerprint images themselves acquired by the fingerprint recognition systems. These improvements lead to improved matching performance. Image quality is a predictor of matching performance for detection and recognition systems. Knowledge of the force level significantly increases the average reported image quality score by about 20% if knowledge of the fingerprint sensing technology and applied force is known. Correspondingly, fingerprint matching performance can improve over 10% for optical and capacitance technologies if knowledge of the fingerprint sensing technology and applied force is known.

Further, such systems and methods analyzed the impact of human interaction with fingerprint sensors and the implications on image quality and subsequent algorithm performance. The significance of user interaction with various fingerprint recognition sensor technologies is apparent, given that fingerprint recognition is the most widely used of the biometric technologies, with popular applications in law enforcement (e.g., the Integrated Automated Fingerprint Identification System—IAFIS), access control, time and attendance recordkeeping, and personal computer/network access. Fingerprint identification is also used with personal data assistants, mobile phones, laptop computers, desktop keyboards, mice, and universal serial bus (USB) flash media drives.

However, even given these improvements in biometric data acquisition methods, there is still an unmet need for a feedback technology that goes beyond mere improvements in methods of biometric data recognition in order to provide improved accessibility and ease of use for users with disabilities, increased throughput, increased image quality, increased performance, an ability for achieving optimal force levels (e.g., by providing a number), and stability determination (which will aid in determining whether the subject is at their optimal performance).

Examples of the current ways in which the aforementioned unmet needs are currently being addressed include, but are not limited to: using basic signage at the border and on certain devices being utilized and requiring the immigration officer (if, e.g., the device is being used at the border) to provide the feedback, which by its nature is very limited. Clearly, therefore, a more robust improvement is needed to allow for modality neutral methods of biometric sensing that goes beyond mere fingerprint reading.

SUMMARY

A method of optimizing data acquisition of a biometric sensor is disclosed, comprising determining an optimal qualitative or quantitative threshold based on at least one predetermined factor, receiving an input from a user corresponding to the predetermined factor, calculating a value of a variable associated with the predetermined factor and the input received from the user, and providing a feedback to the user when the value approaches the threshold within a margin.

According to one embodiment of the method, the biometric sensor comprises a fingerprint sensor.

According to one embodiment of the method, the at least one predetermined factor comprises a force applied by the user to the biometric sensor.

According to one embodiment of the method, the force is applied to the fingerprint sensor by a finger of the user.

According to one embodiment of the method, the at least one predetermined factor comprises a position of a portion of the user's body relative to the biometric sensor.

According to one embodiment of the method, the portion is a finger.

According to one embodiment of the method, the portion is an iris.

According to one embodiment of the method, the feedback is vibrational.

According to one embodiment of the method, the vibrational feedback is provided through a fingerprint sensor to a finger of the user.

According to one embodiment of the method, the vibrational feedback is provided through a mat to the user's feet.

According to one embodiment of the method, the feedback is visual.

According to one embodiment of the method, the feedback is audible.

According to one embodiment of the method, the biometric sensor is a camera.

According to one embodiment of the method, the biometric sensor is an iris recognition sensor.

An apparatus is also disclosed, comprising a biometric sensor, the biometric sensor configured to receive an input from a user, the input corresponding to a predetermined factor, and a feedback device, the feedback device configured to provide feedback to the user when a value associated with the input approaches a predetermined threshold within a margin.

According to one embodiment of the apparatus, the biometric sensor is a fingerprint sensor.

According to one embodiment of the apparatus, the at least one predetermined factor comprises a force applied by the user to the biometric sensor.

According to one embodiment of the apparatus, the force is applied to the fingerprint sensor by a finger of the user.

According to one embodiment of the apparatus, the at least one predetermined factor comprises a position of a portion of the user's body relative to the biometric sensor.

According to one embodiment of the apparatus, the portion is a finger.

According to one embodiment of the apparatus, the portion is an iris.

According to one embodiment of the apparatus, the feedback device comprises a vibrational feedback device.

According to one embodiment of the apparatus, the feedback device comprises a coin motor.

According to one embodiment of the apparatus, the feedback device is configured to provided vibrational feedback to a finger of the user.

According to one embodiment of the apparatus, the feedback device is configured to provide vibrational feedback to the feet of the user.

According to one embodiment of the apparatus, the feedback device is a visual feedback device.

According to one embodiment of the apparatus, the feedback device is an audible feedback device.

According to one embodiment of the apparatus, the biometric sensor is an optical sensor.

According to one embodiment of the apparatus, the biometric sensor is an iris recognition sensor.

According to one embodiment of the apparatus, the apparatus further comprises a processor operatively connected to the biometric sensor and the feedback device According to one embodiment of the apparatus, the apparatus further comprises a memory operatively connected to the processor.

DETAILED DESCRIPTION

Figure 1:
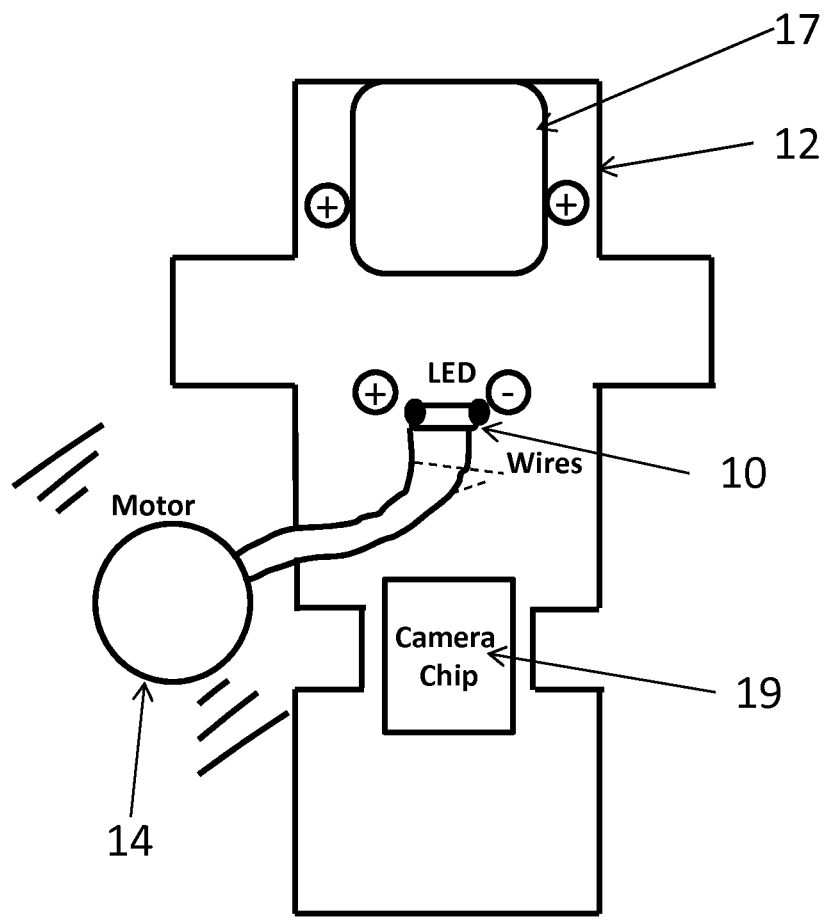
FIG. 1 is a schematic of a scanner board with a motor.

For the purposes of promoting an understanding of the principles of the present disclosure, reference will now be made to certain illustrated embodiments and specific language will be used to describe the same. No limitation of the scope of the claims is thereby intended. Such alterations and further modifications of the present disclosure, and such further applications of the principles of the present disclosure as described and claimed herein as would normally occur to one skilled in the art to which the present disclosure pertains, are contemplated, and desired to be protected.

To address the unmet need for a user-friendly feedback-customization based on the user interaction with the device, the present system and method disclosed herein uses, for perspective illustrations only, the comparative evaluation of optical and capacitance fingerprint sensors to determine the effect on different fingerprint sensing technologies by finger force, along with describing a modality-neutral improvement (i.e., based on fingerprint, face, iris, etc.).

For other modalities (such as iris recognition), the physical feedback would be transmitted through another body part (such as the feet) in the form of a vibrating pad or mat, and based upon the feedback generated from the sensor.

As far as customization of applied forces needed by various individuals, in one embodiment of the present disclosure, the customization pertains to a force metric, and a stability score index which has been calculated for an individual based on a pre-determined set of criteria. The stability score index ("SSI") is calculated using Equation 1.

$$SSI_i = \frac{\sqrt{(x_{i_2} - x_{i_1})^2 + (y_{i_2} - y_{i_2})^2}}{\sqrt{(x_{max} - x_{min})^2 + (y_{max} - y_{min})^2}} \quad \text{Equation 1}$$

where:

$x_1$ and $x_2$ represent genuine scores for two examined force levels, respectively;

$y_1$ and $y_2$ represent an individual's imposter scores for each force level;

$x_{min}$ and $x_{max}$ represent the minimum possible score and maximum obtained genuine score that was seen in all fierce levels; and $y_{max}$ and $y_{min}$ represent the maximum obtained imposter score and minimum possible score that was seen in all force levels, respectively.

For purposes of this disclosure, "genuine" represents a "single good-faith" attempt by a user to match their own stored template. "Imposter" attempt represents an attempt of an individual to match the stored template of a different individual by presenting a simulated or reproduced biometric sample or by intentionally modifying his or her own biometric characteristics. The genuine scores and imposter scores are determined by a commercially available biometric identification software (MEGAMATCHER by NEUROTECHNOLOGY).

Referring to Equation 1, the numerator value represents the individual's movement over the two force levels and the denominator is the maximum possible movement amongst all force levels. Force level can be substituted for other variables (such as time, multiple sensors, or multiple modalities). This force level will be displayed for an individual once the individual places his or her token or biometric into the sensor. As an example of an embodiment of the present disclosure, one individual may have an optimal force level of 9N for fingerprint recognition, and that this point, the individual's image quality and resulting performance is optimized ("stability score"). A haptic feedback device (such as a vibrating pad) connected to the fingerprint sensor will then vibrate at different frequencies indicating good placement, and that the individual has achieved the appropriate force. Such a setup can work for people who are blind, for example, due to the novel benefit of allowing feedback to be acquired from the vibration.

In another embodiment, referring to FIG. 1, whenever a scan is made, there is a light emitting diode (LED) 10 on the device 12 that flashes. The device 12 may also comprise the fingerprint sensor 17 and associated processing devices, such as camera chip 19 which receives and processes the input signals from the sensor 17. The voltage running across the LED 10 is enough to power feedback device, such as motor 14. In one embodiment, the motor 14 may comprise a coin motor. In user trials, the motor 14 would vibrate when the LED 10 lit up.

Figure 2:
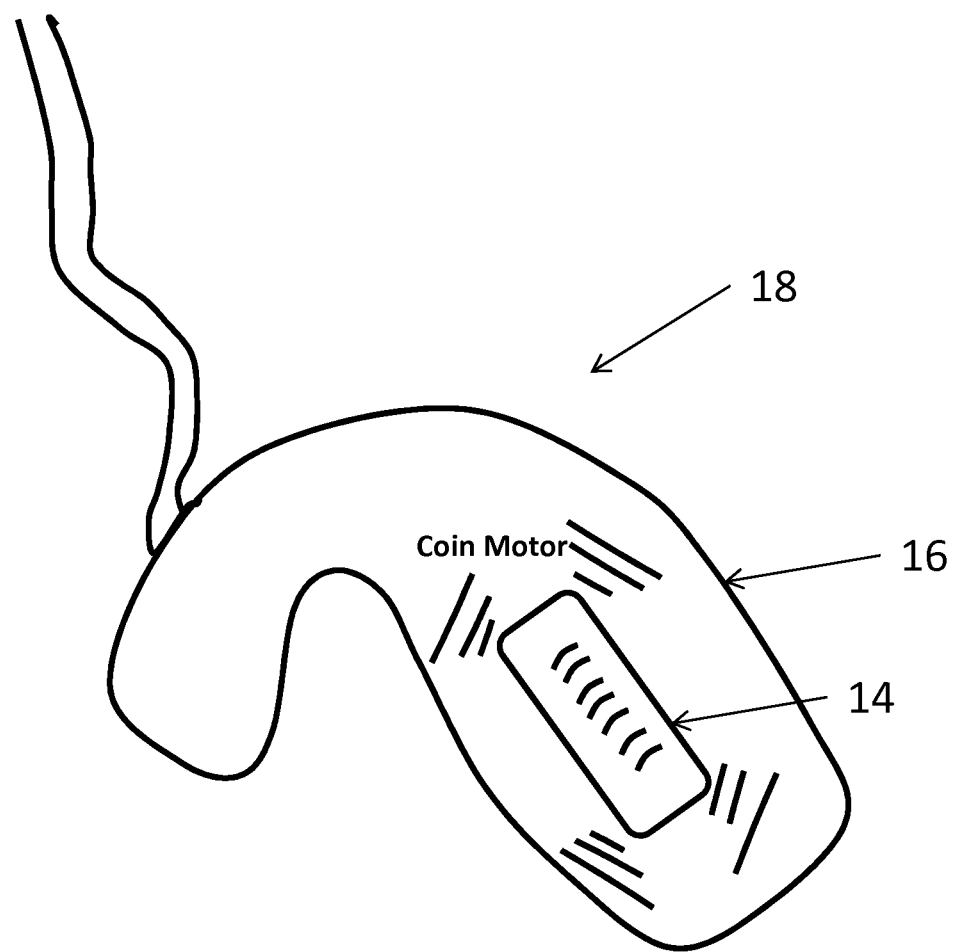
FIG. 2 is an illustration of an ergonomic fingerprint reader with haptic feedback.
Figure 3:
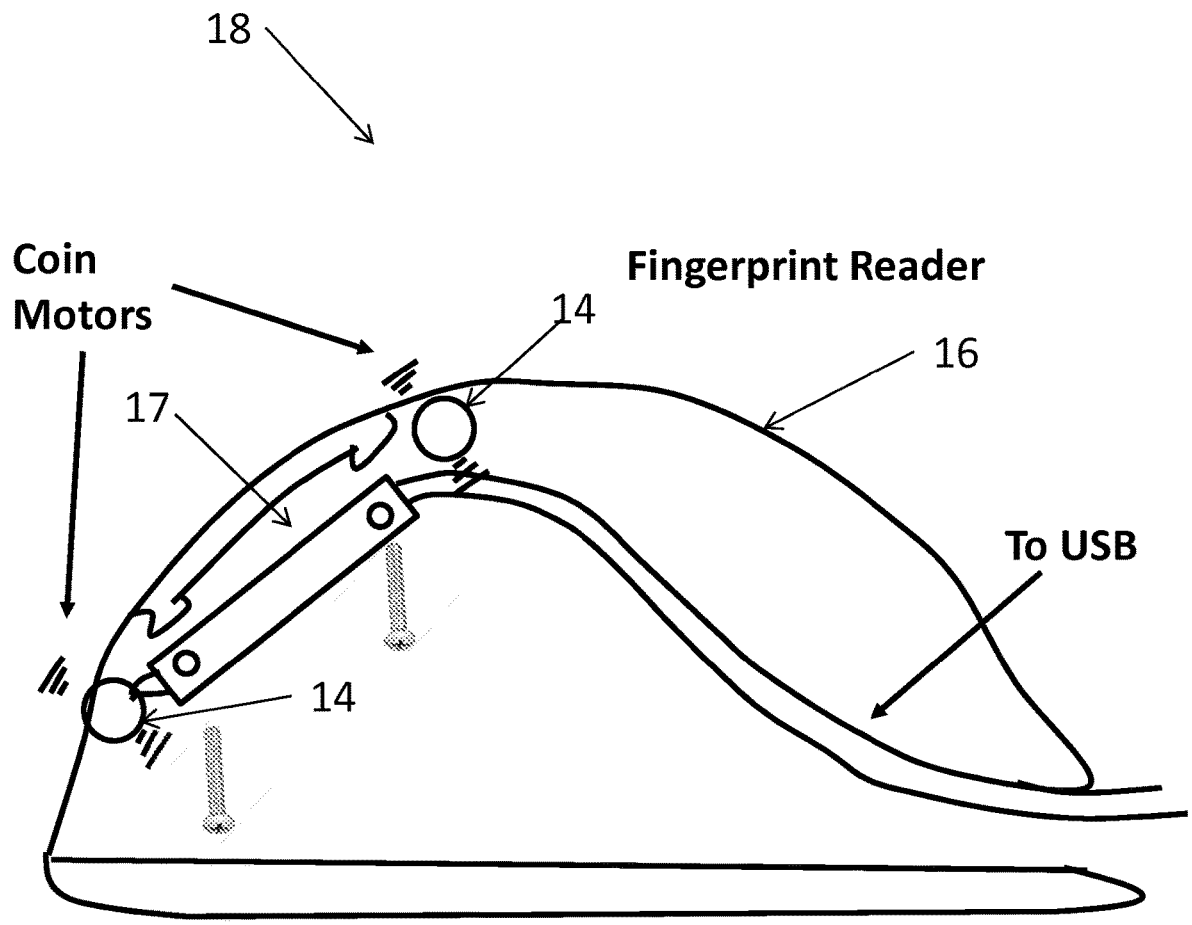
FIG. 3 is an illustration showing the fingerprint reader and motor setup.
Figure 4:
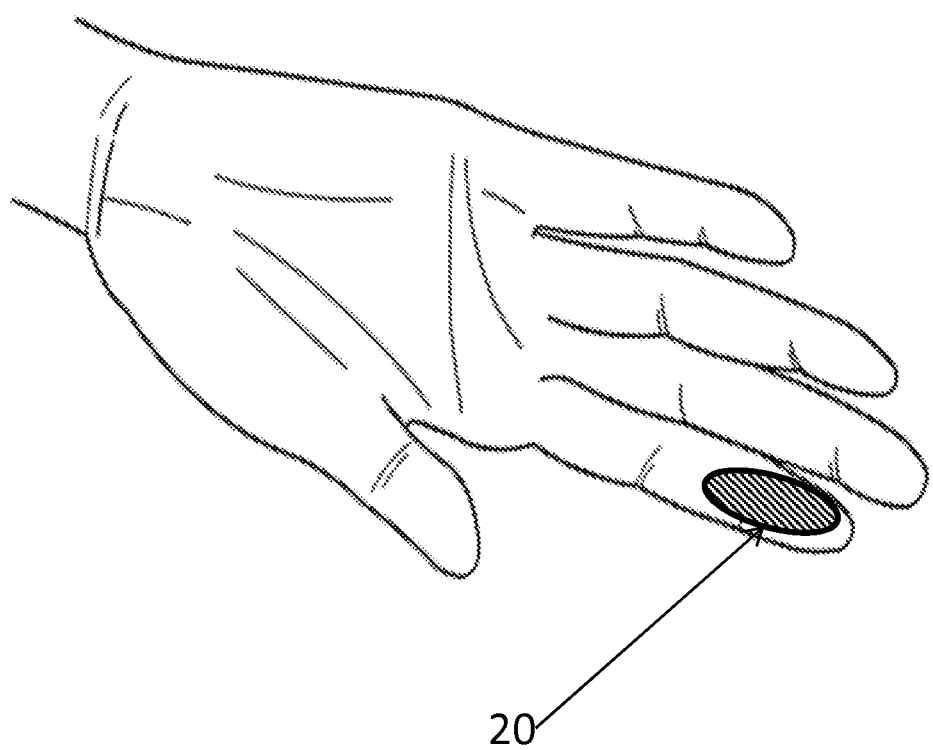
FIG. 4 is an illustration depicting the aerial perspective view of a fingerprint reader and the hand.

FIG. 2 illustrates another perspective view of an example of the haptic feedback motor setup in which the coin motor 14 is built in to a casing 16 of a traditional computer-mouse design of a fingerprint reader 18 which curves naturally with the shape of a hand. The fingerprint reader 18 includes a fingerprint sensor 17 which may be implemented in a variety of forms, including an optical sensor, a capacitive sensor, or other types of fingerprint sensors known in the art. FIG. 3 depicts a close up view of the coin motor 14 and fingerprint reader 18 setup. More specifically, FIG. 3 illustrates an embodiment of the present disclosure wherein the device 18 will be able to contour to an individual's hand (shown by the curved outer casing 16) in order to take a biometric scan. FIG. 4 depicts an aerial view of the finger placement 20 on the fingerprint reader 18.

Figure 5:
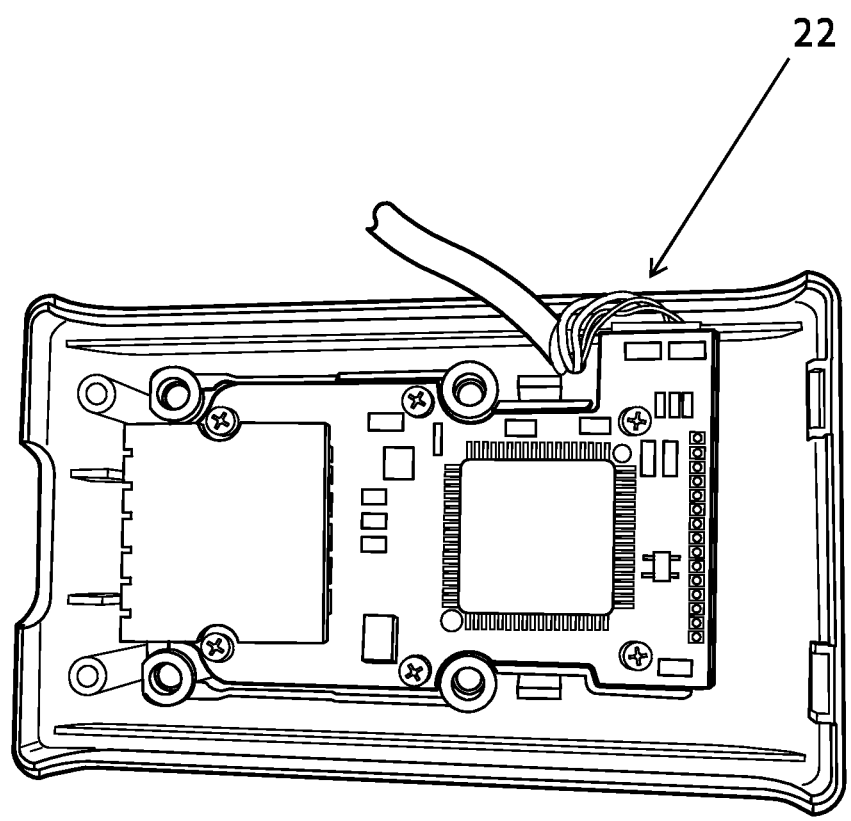
FIG. 5 depicts a picture of a traditional fingerprint sensor before the motor is attached to it.
Figure 6:
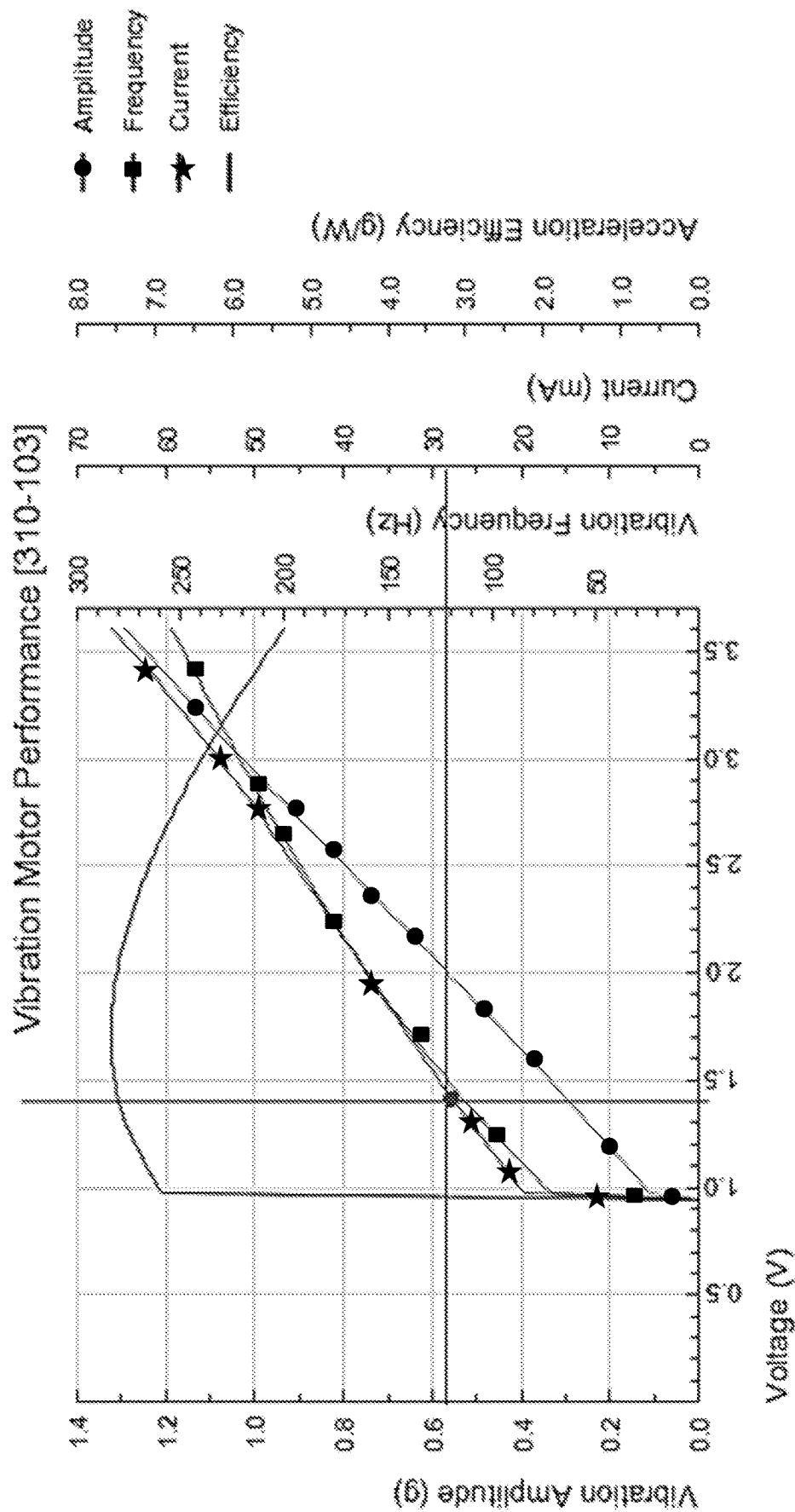
FIG. 6 is a plot showing vibration motor performance when the disclosed setup is used.

In another embodiment, the motor 14 is attached to the sensor 17 so that it provides the maximum feedback to the user. An example is shown in FIG. 5, which depicts a picture of a traditional fingerprint sensor 22 before the motor 14 is attached to it. The sensor 22 and its housing setup provides plenty of room for exact locations in which to place the motor. Referring to FIG. 6, which is a plot of vibration amplitude versus voltage, at an exemplary operating point depicted, the vibration amplitude is 50% of its maximum, resulting in little to no negative impact on image quality.

The haptic feedback device need not be "haptic" per se. Rather, it can be any device useful to convey information via the senses that the appropriate force and/or placement has been achieved. This can take advantage of the sight and sound senses, for example, and thus is not limited to vibrating motors.

It shall be understood that the devices 12, 17, 19, and/or 18 may include one or more computer processors and memory needed to control the interaction between the sensor 17 and motor 14.

While the present disclosure has been illustrated and described in the drawings and foregoing description, the description is to be considered as illustrative and not restrictive in character. Only the illustrated embodiments, and such alternative embodiments deemed helpful in further illuminating the illustrated embodiments, have been shown and described. Therefore, variations and modifications exist within the scope and spirit of the present disclosure as defined in the following claims.

What is claimed is:

1. An apparatus, comprising:
    a biometric fingerprint identification sensor, the biometric fingerprint identification sensor configured to receive an input from a user, the input corresponding to a predetermined factor, the predetermined factor comprising a force applied by a finger of the user to the biometric fingerprint identification sensor;
    a computer processor connected to the biometric fingerprint identification sensor, the computer processor configured to determine a qualitative or quantitative threshold based on the predetermined factor, receive the input from the fingerprint identification sensor, calculate a value of a variable associated with the predetermined factor and the input, and trigger a feedback output when the value approaches the threshold within a margin;
    a haptic feedback device connected to the computer processor to receive the feedback output, the haptic feedback device configured to provide haptic feedback to the body of the user when the haptic feedback device receives the triggered feedback output from the computer processor indicating the value is within the margin of the predetermined threshold.

2. The apparatus of claim 1, wherein the haptic feedback device comprises a vibrational feedback device.

3. The apparatus of claim 2, wherein the haptic feedback device is configured to provide vibrational feedback to a finger of the user.

4. The apparatus of claim 2, wherein the haptic feedback device is configured to provide vibrational feedback to the feet of the user.

* * * * *